United States Patent
Laverdiere et al.

(10) Patent No.: US 9,227,784 B2
(45) Date of Patent: Jan. 5, 2016

(54) CONVEYOR ASSEMBLY AND ASSOCIATED METHOD

(71) Applicants: James Laverdiere, Boxford, MA (US); Joshua Laverdiere, Peabody, MA (US); Stuart Olsen, Newburyport, MA (US); Martin D. Flansbury, Newburyport, MA (US); Michael R. Simon, Peabody, MA (US); Brian C. Bourque, Seabrook, NH (US)

(72) Inventors: James Laverdiere, Boxford, MA (US); Joshua Laverdiere, Peabody, MA (US); Stuart Olsen, Newburyport, MA (US); Martin D. Flansbury, Newburyport, MA (US); Michael R. Simon, Peabody, MA (US); Brian C. Bourque, Seabrook, NH (US)

(73) Assignee: Kleenline LLC, Newburyport, MA (US)

(*) Notice: Subject to any disclaimer, the term of this patent is extended or adjusted under 35 U.S.C. 154(b) by 0 days.

(21) Appl. No.: 14/302,683

(22) Filed: Jun. 12, 2014

(65) Prior Publication Data

US 2014/0367228 A1    Dec. 18, 2014

Related U.S. Application Data

(60) Provisional application No. 61/835,301, filed on Jun. 14, 2013.

(51) Int. Cl.
| | |
|---|---|
| *B65G 15/62* | (2006.01) |
| *B65G 15/02* | (2006.01) |
| *B65G 15/64* | (2006.01) |
| *B65G 21/20* | (2006.01) |
| *B65G 21/22* | (2006.01) |
| *B65G 15/60* | (2006.01) |

(52) U.S. Cl.
CPC ............. *B65G 15/62* (2013.01); *B65G 15/02* (2013.01); *B65G 15/60* (2013.01); *B65G 15/64* (2013.01); *B65G 21/20* (2013.01); *B65G 21/22* (2013.01)

(58) Field of Classification Search
CPC ........ B65G 21/20; B65G 21/22; B65G 15/02; B65G 15/60; B65G 15/62; B65G 15/64
USPC .......................................... 198/831, 837, 841
See application file for complete search history.

(56) References Cited

U.S. PATENT DOCUMENTS

| | | | |
|---|---|---|---|
| 3,941,238 A | 3/1976 | Lapeyre | |
| 3,943,605 A | 3/1976 | Nystrand | |
| 3,991,876 A | 11/1976 | Schmidt, Sr. et al. | |
| 3,993,185 A | 11/1976 | Fleckenstein et al. | |
| 3,998,447 A | 12/1976 | Joa | |
| 4,109,343 A | 8/1978 | Weis et al. | |
| 4,227,610 A * | 10/1980 | Gerdes et al. | 198/831 |
| 4,271,683 A | 6/1981 | Williams | |

(Continued)

FOREIGN PATENT DOCUMENTS

| | | |
|---|---|---|
| EP | 98227 A1 * | 1/1984 |
| EP | 566837 A1 * | 10/1993 |

(Continued)

*Primary Examiner* — Leslie A Nicholson, III
(74) *Attorney, Agent, or Firm* — Thompson Hine LLP

(57) ABSTRACT

A curved conveyor assembly includes a frame that defines a curved conveyance path. A conveyor belt is positioned on the frame system for travel along the curved conveyance path. At least one hold down guide is mounted to the frame and manually movable between an operating position and an access position. In the operating position a retaining lip of the hold down guide extends into the curved conveyance path proximate an edge of the conveyor belt for limiting upward movement of the edge of the conveyor belt. In the access position the retaining lip is moved away from the edge of the conveyor belt.

17 Claims, 9 Drawing Sheets

(56) References Cited

U.S. PATENT DOCUMENTS

| | | |
|---|---|---|
| 4,289,791 A | 9/1981 | Weinstein |
| 4,301,910 A | 11/1981 | Price |
| 4,307,642 A | 12/1981 | Yanagida |
| 4,319,460 A | 3/1982 | Williams |
| 4,529,470 A | 7/1985 | Weinstein |
| 4,674,627 A | 6/1987 | Dussan et al. |
| 4,716,624 A | 1/1988 | Massey, Jr. |
| 4,751,997 A | 6/1988 | Hirsch |
| 5,052,548 A | 10/1991 | Andrews |
| 5,129,508 A * | 7/1992 | Shelstad .................... 198/860.3 |
| 5,402,809 A | 4/1995 | Smith |
| 5,566,817 A | 10/1996 | Meeker |
| 5,762,712 A | 6/1998 | Sohn |
| 5,811,137 A | 9/1998 | Clark et al. |
| 5,868,899 A | 2/1999 | Gundersen |
| 6,371,283 B1 | 4/2002 | Manchester |
| 6,523,679 B1 | 2/2003 | Manchester |
| 6,591,979 B1 | 7/2003 | Karpy |
| 6,623,264 B1 | 9/2003 | Borresen et al. |
| 6,902,053 B1 * | 6/2005 | Long .............................. 198/840 |
| 7,232,030 B2 * | 6/2007 | Duncan et al. ................. 198/831 |
| 7,325,700 B1 | 2/2008 | Masten et al. |
| 7,546,916 B2 * | 6/2009 | Jenny ............................ 198/831 |
| 7,726,593 B2 | 6/2010 | Heidel |
| 7,753,194 B1 | 7/2010 | Jager et al. |
| 8,443,720 B2 | 5/2013 | Takai et al. |

FOREIGN PATENT DOCUMENTS

| | | | |
|---|---|---|---|
| EP | 2697140 B1 * | 9/2014 | |
| JP | 2001122413 A * | 5/2001 | |

\* cited by examiner

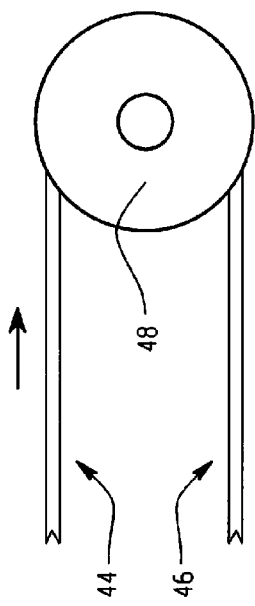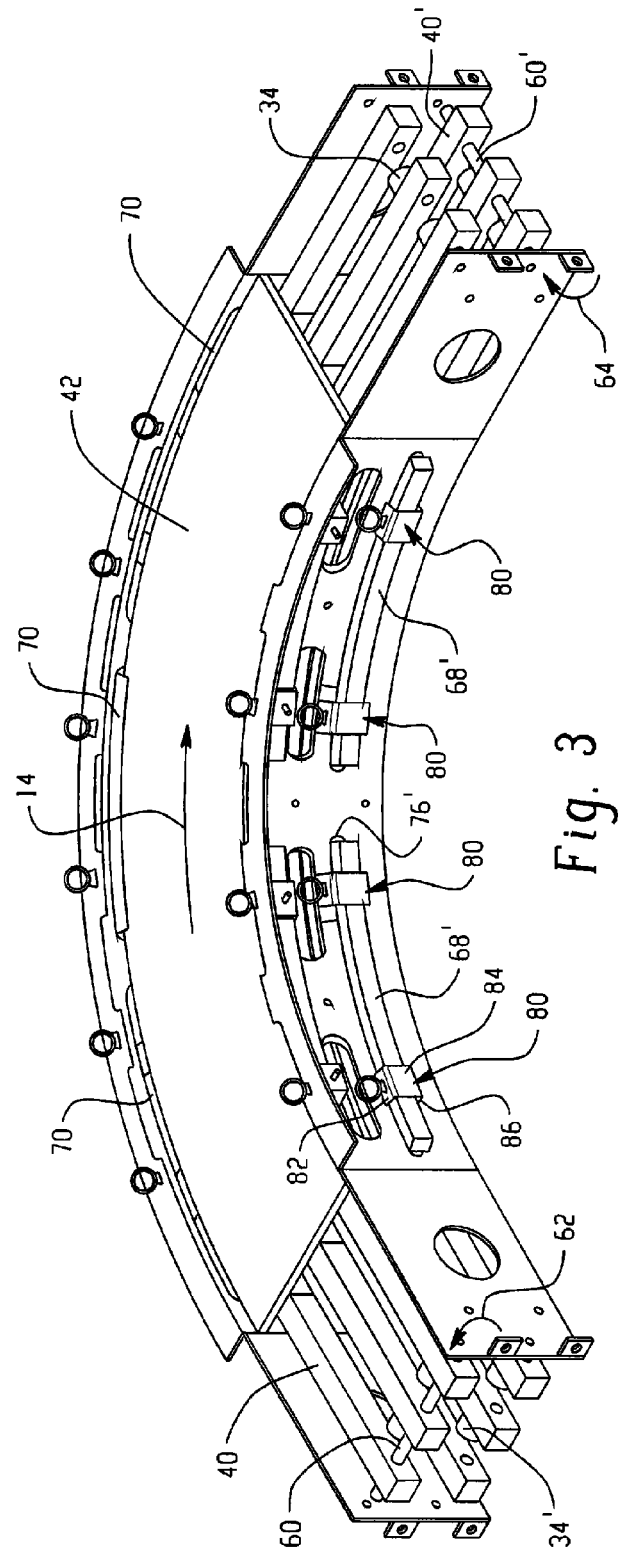

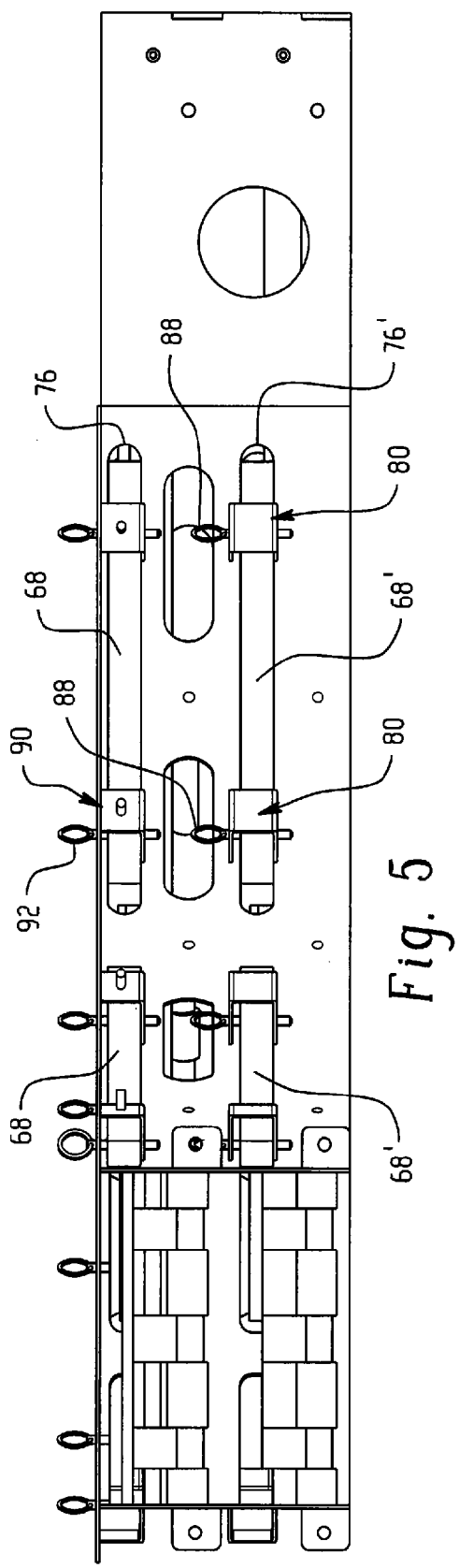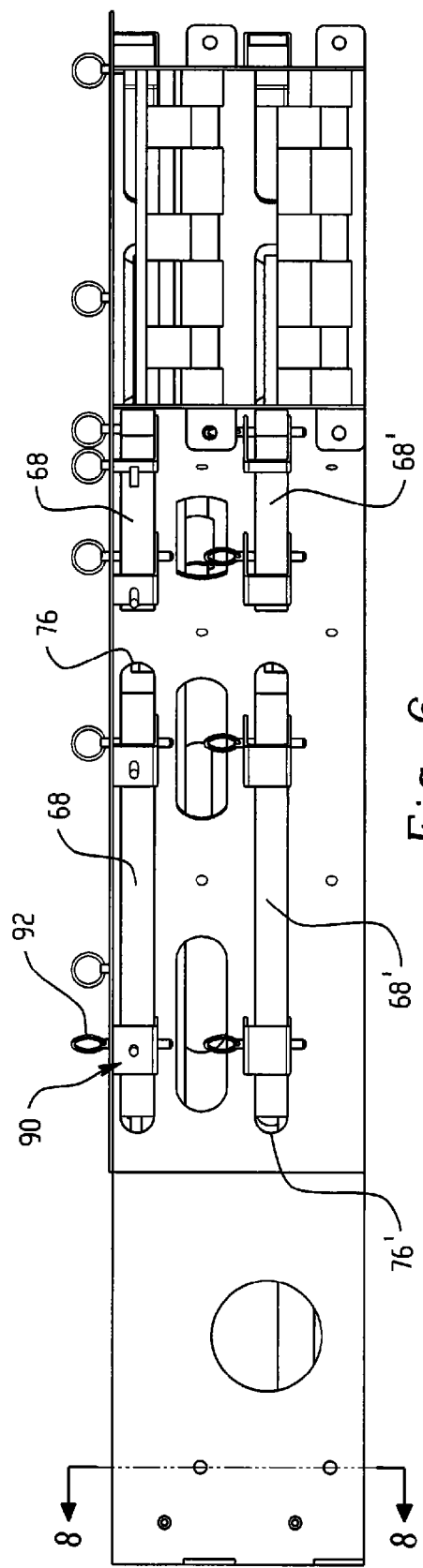

CONVEYOR ASSEMBLY AND ASSOCIATED METHOD

CROSS-REFERENCES

This application claims the benefit of U.S. Provisional Application Ser. No. 61/835,301, filed Jun. 14, 2013, which is incorporated herein by reference.

TECHNICAL FIELD

This application relates generally to conveyors use for conveying items in the process and packaging industry and, more specifically, to a conveyor assembly adapted for cleanability and related method of assembly and cleaning.

BACKGROUND

Conveyor systems are commonly used in the process and packaging industry to move items from one location or process to another. For many applications, such as the food industry, cleanability of machines and systems, including conveyors, is important. At the same time, cleanability needs to be considered in the context of the skillset of the personnel that will be carrying out the cleaning process.

Conveyor systems commonly include both straight sections and curved sections. Providing desirable features in both sections adapted for cleaning is desirable. However, curved sections are particularly problematic due to the fact that in curved conveyor sections the belt has a greater tendency to lift at the outside part of the turn.

With existing technology, conveyor belts with integrated hold down tabs may be used in curved conveyor sections. However, such conveyor belts result in increased cost and the tabs tend to break off, increasing maintenance and service costs. Such belts are also unfavorable from the standpoint of ease of cleaning.

Accordingly, it would be desirable to provide a conveyor assembly and associated method adapted to facilitate cleaning operations in straight conveyor sections and/or curved conveyor sections.

SUMMARY

In one aspect, a curved conveyor assembly includes a frame system with an inner curved side portion, an outer curved side portion spaced from the inner curved side portion to define a curved path, and at least one slot formed in one of the outer curved side portion or the inner curved side portion. A conveyor belt is positioned between the inner curved side portion and the outer curved side portion and movable along the curved path. At least one curved hold down guide is associated with the slot and located in an operating position in which a retaining lip of the curved hold down guide is positioned within the curved path proximate a top side of an edge of the conveyor belt for limiting upward movement of the edge of the conveyor belt as the conveyor belt moves along the curved path, the curved hold down guide movable relative to the slot and the frame system to an access position in which the retaining lip is spaced from the edge of the conveyor belt enabling the edge of the conveyor belt to move upward.

In one implementation, at least part of the curved hold down guide is movable laterally through the slot for repositioning the curved hold down guide from the operating position to the access position.

In one implementation, a body of the curved hold down guide is movable laterally through the slot in a direction away from the curved path for movement from the operating position and the access position, in the access position the curved hold down guide remains aligned with the slot.

In one implementation, the slot is located in the outer curved side portion, the outer curved side portion includes multiple slots each having a respective outer curved hold down guide therein and the inner curved side portion includes multiple slots each having a respective inner curved hold down guide therein.

In one implementation, at least one latch is movable between a first position for holding the curved hold down guide in the operating position and a second position for allowing the curved hold down guide to move through the slot from the operating position to the access position.

In one implementation, the latch is formed by a manually movable pin member extending through a bracket and into engagement with the curved hold down guide, the bracket located adjacent the slot.

In one implementation, the pin is tethered to the frame.

In one implementation, the bracket further includes a stop surface for limiting movement of the curved hold down guide laterally away from the curved path and a support surface for supporting the curved hold down guide when in the access position.

In one implementation, the slot has a keyway configuration, and the curved hold down guide includes a keyway button that passes through the keyway slot.

In one implementation, the slot is configured such that when the curved hold down guide is in the operating position the keyway button is positioned toward a retention end of the slot. The keyway button is moved along the slot to a removal segment of the slot to allow the keyway button to be removed from the slot in order to move the curved hold down guide from the operating position to the access position. In the access position the curved hold down guide is detached from the frame system.

In one implementation, the frame system includes multiple slots, each having a keyway configuration, and the curved hold down guide includes multiple keyway buttons each passing through a respective one of the slots when the curved hold down guide is in the operating position.

In one implementation, the retention end of the slot is downstream of the removal segment of the slot relative to a conveyance direction of the conveyor belt so that interaction between the conveyor belt and the curved hold down guide during movement of the conveyor belt tends to urge the curved hold down guide into the operating position.

In another aspect, a curved conveyor assembly includes a frame system with an inner curved side portion and an outer curved side portion spaced from the inner curved side portion to define a curved path, the outer curved side portion including a slot therein. A modular conveyor belt is positioned between the inner curved side portion and the outer curved side portion and movable along the curved path. At least one outer curved hold down guide is associated with the slot, the outer curved hold down guide movable through the slot between an operating position and an access position. In the operating position a retaining lip of the outer curved hold down guide extends into the curved path proximate a top side of an outer edge of the modular conveyor belt for limiting upward movement of the outer edge of the modular conveyor belt as the modular conveyor belt moves along the curved path. In the access position the retaining lip is moved away from the modular conveyor belt such the retaining lip is clear of the outer edge of the modular conveyor belt enabling the outer edge of the modular conveyor belt to move upward.

In one implementation, the curved conveyor assembly of the preceding a paragraph further includes the inner curved side portion having a slot therein. At least one inner curved hold down guide is associated with the slot of the inner curved side portion, the inner curved hold down guide movable through the slot of the inner curved side portion between an operating position and an access position. In the operating position a retaining lip of the inner curved hold down guide extends into the curved path proximate the top side of an inner edge of the modular conveyor belt for limiting upward movement of the inner edge of the modular conveyor belt as the modular conveyor belt moves along the curved path. In the access position the retaining lip of the inner curved hold down guide is moved away from the modular conveyor belt so as to be clear of the inner edge of the modular conveyor belt enabling the inner edge of the modular conveyor belt to move upward (e.g., for the purpose of access below the belt for maintenance and/or cleaning purposes).

Multiple outer and inner hold down guides may be provided. Where the conveyor belt includes a forward moving upper level and a return moving lower level, upper and lower sets of hold down guides may be provided.

In one implementation of the curved conveyor assembly of any of the three preceding paragraphs, the modular conveyor belt rides atop at least one wear strip when moving along the curved path. The wear strip includes one end pivotally mounted to the frame and an opposite end sitting upon a cross support of the frame such that, when the modular conveyor belt is removed, the wear strip can be pivoted upward to access a space below the wear strip for cleaning or maintenance. The pivot point may also be configured for release so that the wear strip can be fully removed.

Where multiple spaced apart wear strips are located along a width of the curved path, each of the multiple wear strips may include one end mounted on a common pivot.

In another aspect, a curved conveyor assembly includes a frame that defines a curved conveyance path. A conveyor belt is positioned on the frame system for travel along the curved conveyance path. At least one hold down guide is mounted to the frame and manually movable between an operating position and an access position. In the operating position a retaining lip of the hold down guide extends into the curved conveyance path proximate an edge of the conveyor belt for limiting upward movement of the edge of the conveyor belt. In the access position the retaining lip is moved away from the conveyor belt such the retaining lip is clear of the edge of the conveyor belt.

In one example of the foregoing aspect, the hold down guide is mounted in a slot of the frame and held in the operating position by a manually operable latch.

In another aspect, a method of facilitating maintenance and/or cleaning of a curved conveyor involves: utilizing a curved frame system that defines a curved conveyance path along which a conveyor belt extends; mounting a plurality of hold down guides to the frame system in respective operating positions, each hold down guide, when in its operating position, including a lip portion within the curved conveyance path and positioned proximate a top edge portion of the conveyor belt for limiting upward movement of the top edge portion of the conveyor belt; providing each hold down guide with at least one latch that maintains the hold down guide in the operating position; releasing the latch associated with at a particular hold down guide of the plurality of hold down guides; and subsequent to the releasing step, moving the particular hold down guide away from the conveyance path such that the lip portion is clear of the top edge portion of the conveyor belt to enable the top edge portion to be lifted upward.

In one implementation of the foregoing aspect, the releasing step is performed (i) manually, without the use of any tool or (ii) automatically via an automated mechanism.

In one implementation of the method of either of the two preceding paragraphs a bracket of the frame system is utilized to support the particular hold down guide alongside the conveyance path after movement of the particular hold down guide away from the conveyance path.

In one implementation of the method of the preceding paragraph, the latch is formed by a pin member that passes through the bracket and engages part of the particular hold down guide to maintain the hold down guide in the operating position.

In another aspect, a method of maintenance and/or cleaning of a curved conveyor involves: utilizing a curved frame system that defines a curved conveyance path along which a conveyor belt extends, and having a plurality of hold down guides mounted to respective slots on the frame system with the hold down guides in respective operating positions, each hold down guide, when in its operating position, including a lip portion within the curved conveyance path and positioned proximate a top edge portion of the conveyor belt for limiting upward movement of the top edge portion of the conveyor belt; and moving each hold down guide relative to its respective slot so as to move the hold down guide to an access position that permits upward movement of the top edge portion of the conveyor belt.

In one implementation of the method, each hold down guide includes at least one latch that maintains the hold down guide in the operating position. The method further includes: releasing the latch associated with at a particular hold down guide of the plurality of hold down guides; and subsequent to the releasing step, moving the particular hold down guide laterally through the slot and away from the conveyance path such that the lip portion is clear of the top edge portion of the conveyor belt to enable the top edge portion to be lifted upward.

In another implementation each slot has a keyway configuration and each hold down guide has at least one keyway button positioned within a respective slot. The method further includes: moving each hold down guide to shift its keyway button from a retaining end of the slot to a removal segment of the slot and removing the hold down guide from the frame system.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 2 is a schematic depiction showing upper and lower levels;

FIG. 3 is an assembled perspective of the curved conveyor assembly of FIG. 1;

FIG. 5 is one end view of FIG. 4;

FIG. 6 is another end view of FIG. 4;

DETAILED DESCRIPTION

Figure 1:
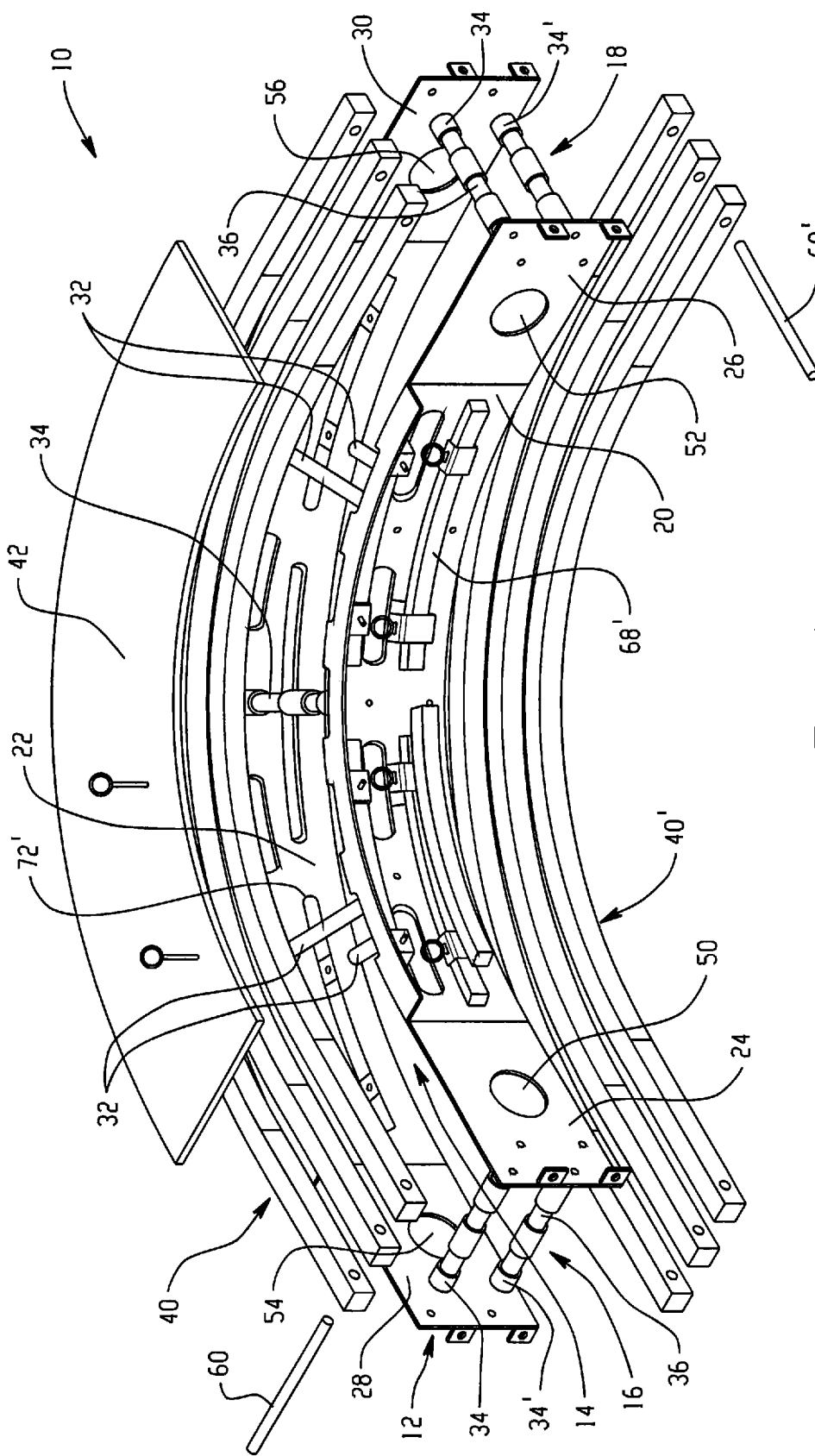
FIG. 1 is an exploded perspective view of a curved conveyor assembly.
Figure 4:
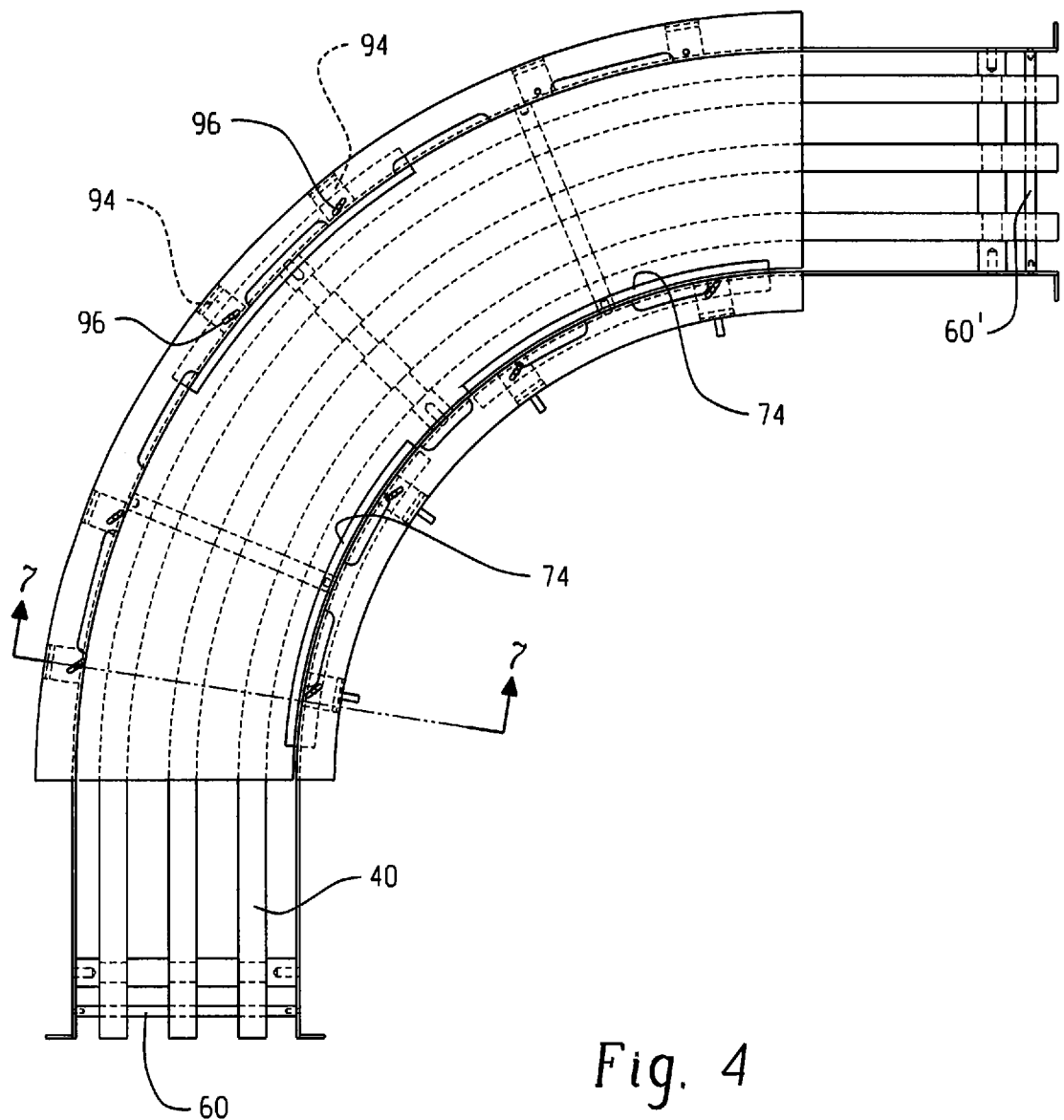
FIG. 4 is a top plan view of FIG. 3.
Figure 7:
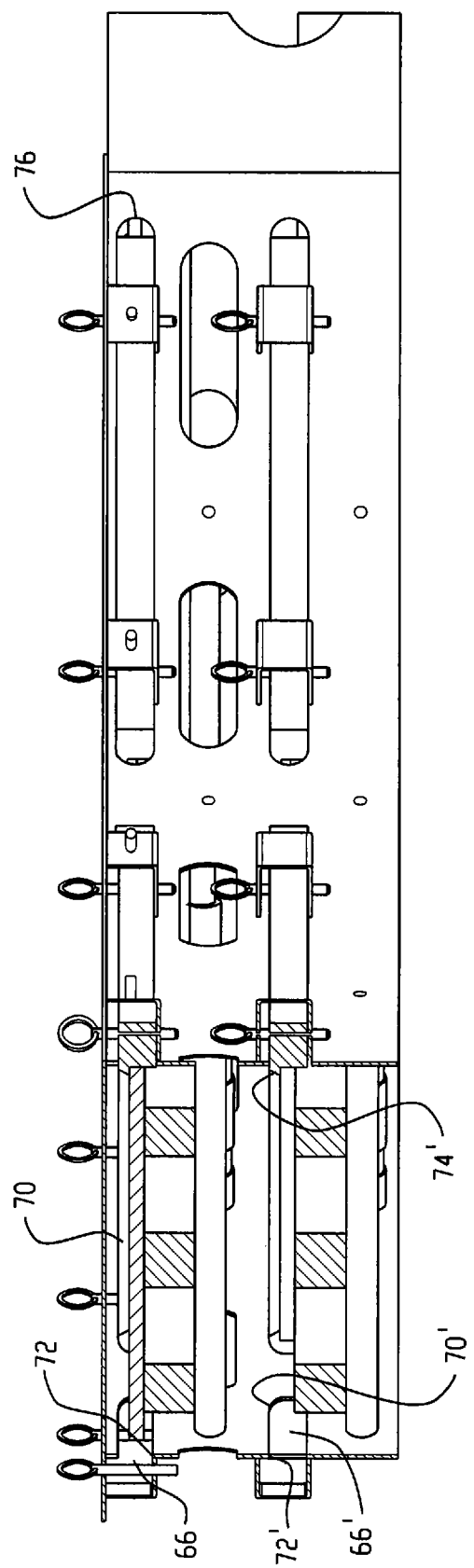
FIG. 7 is a cross-section along line 7-7 of FIG. 4.
Figure 8:
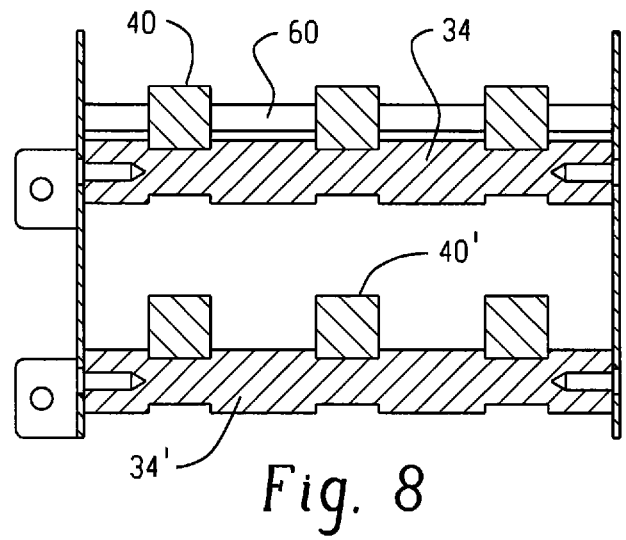
FIG. 8 is a cross-section along line 8-8 of FIG. 6.

Referring to FIG. 1, a partially exploded view of a curved conveyor assembly 10 is shown. A frame system 12 defines a curved conveyance path 14, as well as short straight path sections 16 and 18 at each end of the curved conveyance path suitable for alignment with other conveyors. In the illustrated embodiment, the frame system includes an inner curved side portion 20 and an outer curved side portion 22 spaced from the inner curved side portion, with the curved conveyance path extending between the side portions. Planar side portions 24 and 26 are located at the ends of inner curved side portion 20, and planar side portions 28 and 30 are located at the ends of the outer curved side portion 22. The side portions may, for example, be formed by metal panel members, either straight or curved as the case may be, but other materials could also be used. The side portions are rigidly held to each other by cross-supports extending therebetween. In this regard, cross-supports 32 and 34 are provided, with cross-supports 34 including recessed channels 36 therein and cross-supports 32 lacking recessed channels. By way of example, the cross-supports be of metal or plastic construction, with fasteners passing through the side portions and into the ends of the cross-supports to hold the frame system 10 together as a rigid unit. Alternatively, the cross-supports could be welded in place.

The recessed channels 36 of the cross-supports 34 are configured for receiving and holding elongated wear strips 40 (e.g., in the illustrated case 3, though the number could vary) that are spaced apart along the width of the conveyance path. The wear strips 40 provide upper surfaces upon which the bottom side of a conveyor belt 42 (only partially shown) can slide during movement of the conveyor belt. The wear strips may, for example, be formed of a suitable material such as any food grade plastic, such as acetal, polyethylenes or polypropylenes, or nylon, but other materials could also be used. The conveyor belt, shown for simplicity as a flat planar member, may, by way of example, be a modular plastic conveyor belt. Such conveyor belts are available from, for example, Intralox, Forbo-Siegling, Habasit, Rexnord, Sparks or Uni. Other conveyor belt types could also be used. Notably, both upper supports 34 and wear strips 40 are provided, as well as lower supports 34' and wear strips 40'. In this regard, the upper supports 34 and strips 40 are provided for a forward moving upper level 44 of the conveyor and the lower supports 34' and strips 40' are provided for a return moving lower level 46 of the conveyor (both shown schematically in FIG. 2, where a drive wheel/roll 48 of the system is shown). In this regard, referring again to FIG. 1, openings 50, 52, 54, 56 in respective side portions 24, 26, 28, 30 are provided, through which drive and/or idler wheels/rolls are placed.

Notably, the wear strips 40 and 40' have one end pivotally connect to the frame sides by respective pivot pins 60 and 60', while the opposite end is freely supported (e.g., on one of the supports 34, 34'). Each of strips 40 is mounted on a common pivot pin 60, and each of strips 40' is mounted on a common pivot pin 60'. Thus, when the conveyor belt is removed, the wear strips 40 can be pivoted upward to access the area beneath the wear strips 40 for maintenance and/or cleaning, without entirely removing the wear strips from the assembly. Once the wear strips 40 have been pivoted upward, the wear strips 40' can also be pivoted upward. In the illustrated embodiment, wear strips 40 and 40' pivot in opposite directions (e.g., counterclockwise for strips 40 in the view of FIG. 3, and clockwise for strips 40' in the view of FIG. 3, as represented by arrows 62 and 64 respectively) in an opposite pivot direction given that the wear strips 40 and 40' have pivots at opposite ends. While this pivot arrangement is desirable for wear strips in the curved conveyor assembly, it is recognized that a similar wear strip pivot arrangement could be incorporated into conveyor assembly straights, providing the same advantageous result of facilitating access for cleaning and/or maintenance, without requiring removal of the wear strips altogether. Moreover, by removal of the pivot pins, the wear strips can be removed entirely if desired.

In order to properly hold and guide the conveyor belt 42 in the curved conveyance path 14, a plurality of hold down guides are mounted to the frame and can be moved between respective operating positions and an access positions, without requiring the use of tools. Both outer curved hold down guides 66 (three in the illustrated embodiment) and inner curved hold down guides 68 (two in the illustrated embodiment) are provided for the forward moving upper level of the conveyor, and both outer curved hold down guides 66' (three in the illustrated embodiment) and inner curved hold down guides 68' (two in the illustrated embodiment) are provided for the return moving lower level of the conveyor. In the operating position of each outer curved hold down guide 66, a retaining lip 70 of the hold down guide extends into the curved conveyance path proximate an outer edge of the conveyor belt 42 for limiting upward movement of the outer edge of the conveyor belt 42. When moved to the access position, the retaining lip 70 is moved away from the conveyor belt 42 such the retaining lip 70 is clear of the outer edge of the conveyor belt 42. In this regard, the outer curved side portion 22 includes a set of spaced apart elongates slots 72, each of which holds a respective one of the guides 66 therein. The lower outer curved hold down guides 66' similarly include conveyor belt edge retaining lips 70' and are positioned in respective slots 72' of the side portion 22. Likewise, the inner curved hold down guides 68 include retaining lips 74 associated with the inner edge of the conveyor belt 42 and are positioned in respective slots 76 of inner curved side portion 20, and the inner curved hold down guides 68' include retaining lips 74' and are positioned in slots 76' of the inner curved side portion 20. The inner hold down guides 68 and 68' also provide an inner race along which the inner side edge of the conveyor belt can slide during movement.

The hold down guides are, as indicated above, advantageously manually movable between operating positions and access positions. In the operating positions, the retaining lips are positioned within the conveyance path to hold down the conveyor belt edges, and in the access positions the retaining lips are moved away from the conveyor belt such the retaining lips are clear of the conveyor belt edges, enabling the edges of the conveyor belt to move upward (e.g., for the purpose of removing the conveyor belt for cleaning and/or maintenance). A latch system is provided in connection with each of the hold down guides for maintaining the hold down guide in the operating position, but enabling movement of the hold down guide to the access position upon operation of the latch. In one embodiment, the latch system is formed by one or more pin members associated with each hold down guide, as will be described in more detail below with respect to exemplary hold down guide 68'. In another embodiment, an automated latch system (e.g., movable by a automated mechanism such as a linear actuator (e.g., air cylinder type or electrical type) that is triggered by manual depression of a button) may be used.

As best seen in FIGS. 3 and 5-7, brackets 80 are mounted to the surface of side portion 20 and include an upper lateral segment 82 extending away from the side portion 20 above the slot 76', a vertical segment 84 extending downward past the slot 76' and a lower lateral segment 86 extending back toward the side portion 20 below the slot 76'. Two spaced apart brackets 80 are associated with each slot 76' in the illustrated embodiment, but the number could vary. Each bracket 80 includes a respective pin 88 that passes downward through a pin opening in upper segment 82 and engages the hold down guide 68 to maintain it in the operating position (e.g., by engaging a pin opening in the hold down guide 68 or by contact with an edge of the hold down guide). When the pins 88 are pulled upward out of their respective bracket segments 82, the hold down guide is the free to move through the slot away from the conveyor belt into a position (e.g., the access position) external of the inner curved side portion 20 of the frame, which retracts the retaining lip 74' from the conveyance path. The term access position is used for this moved location of the hold down guide 68' because such position enables the conveyor belt to be removed. The pins 80 may be tethered to the bracket 80 or other part of the frame to assure the pins are not misplaced when removed. Notably, the lower lateral segment 86 of each of the brackets 80 provides a support surface for the hold down guide 68' when in the access position and the vertical segment 84 of each of the brackets 80 provides a stop surface that limits movement of the curved hold down guide laterally away from the curved path, again to reduce the likelihood of misplacement of the hold down guide during the cleaning or maintenance process. It is recognized that hold down guides 68, 66 and 66' include similar latch systems formed by respective brackets and pins (e.g., per brackets 90 and pull-pins 92 for hold down guides 68; per brackets 94 and pull-pins 96 for hold down guides 66 etc.).

Figures 9, 10:
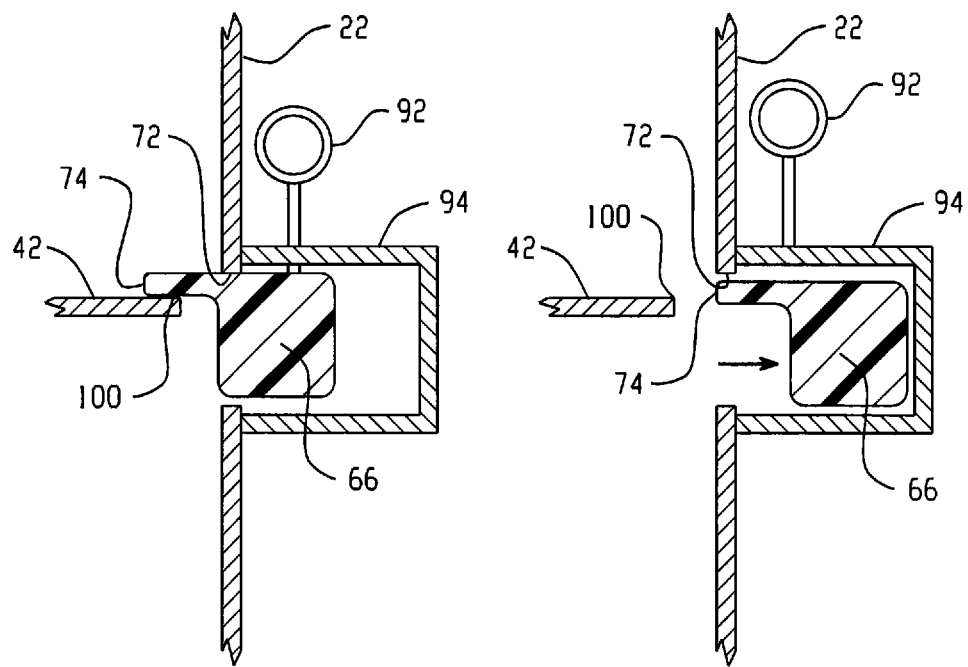
FIG. 9 is a partial cross-section showing a hold down guide in the operating position.
FIG. 10 is a partial cross-section showing the hold down guide moved to the access position.

Thus, the subject conveyor assembly provides a method of facilitating maintenance and/or cleaning of a curved conveyor, where the method involves: utilizing a curved frame system that defines a curved conveyance path along which a conveyor belt extends; mounting a plurality of hold down guides (e.g., 66 seen in FIGS. 9 and 10) to the frame system in respective operating positions, each hold down guide, when in its operating position, including a lip portion 74 within the curved conveyance path and positioned proximate a top edge portion 100 of the conveyor belt 42 for limiting upward movement of the top edge portion of the conveyor belt; providing each hold down guide with at least one latch (e.g., 92) that maintains the hold down guide in the operating position; releasing the latch associated with at a particular hold down guide of the plurality of hold down guides; and subsequent to the releasing step, moving the particular hold down guide away from the conveyance path (e.g., to the right in FIGS. 9 and 10) such that the lip portion 42 is clear of the top edge portion 100 of the conveyor belt to enable the top edge portion to be lifted upward.

Figure 11:
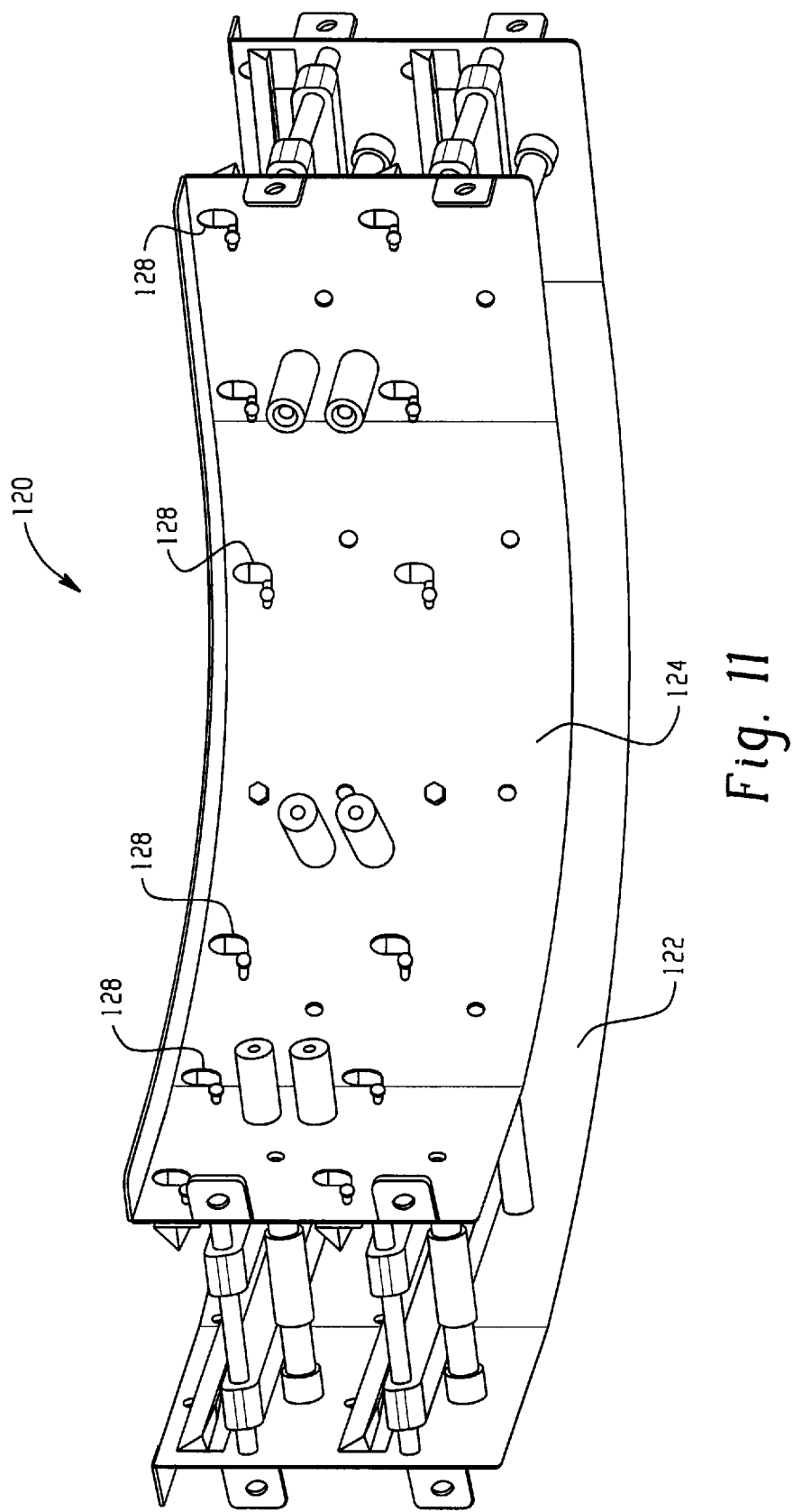
FIG. 11 is a partial perspective of another embodiment of a curved conveyor assembly.
Figure 12:
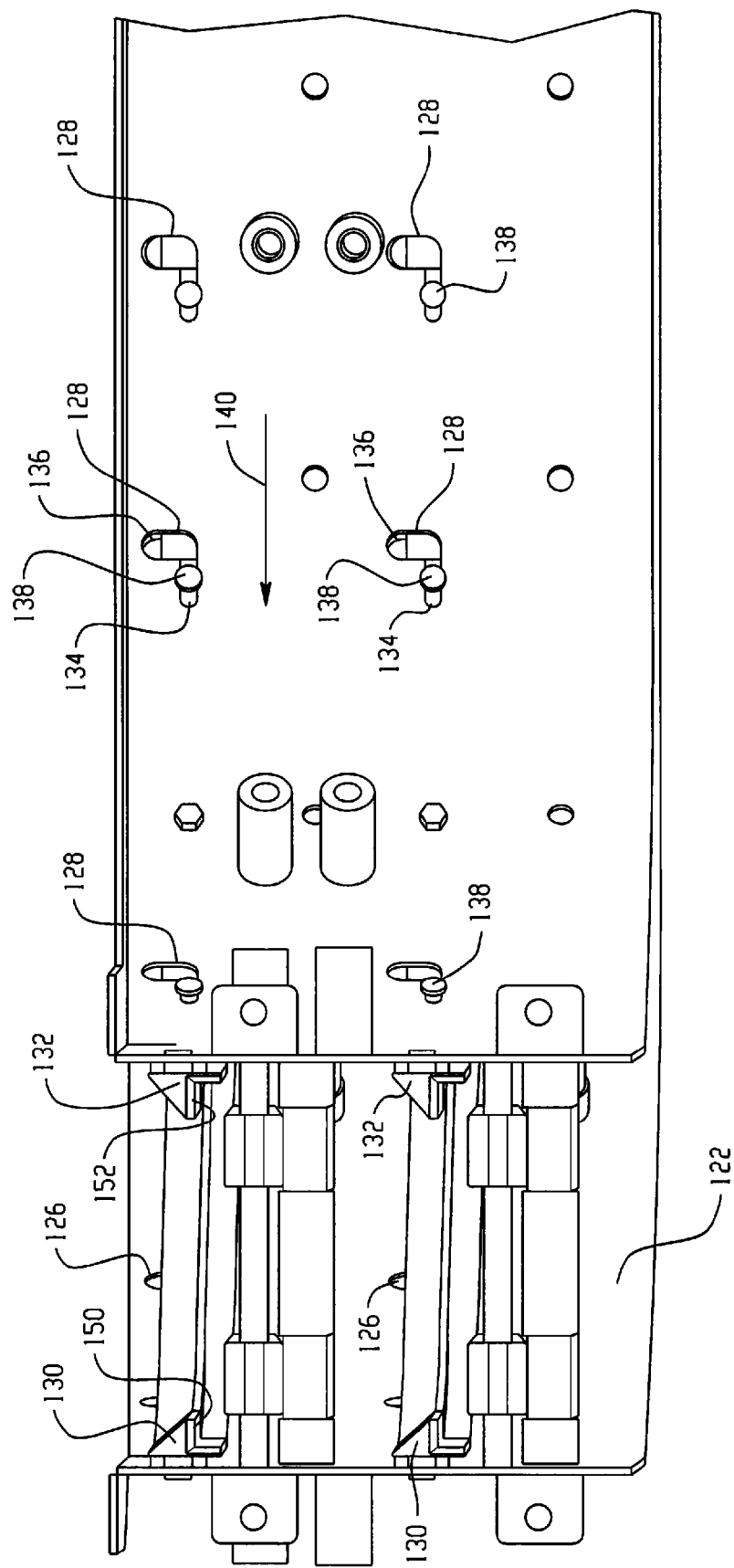
FIG. 12 shows another partial perspective view of the embodiment of FIG. 11.
Figure 13:
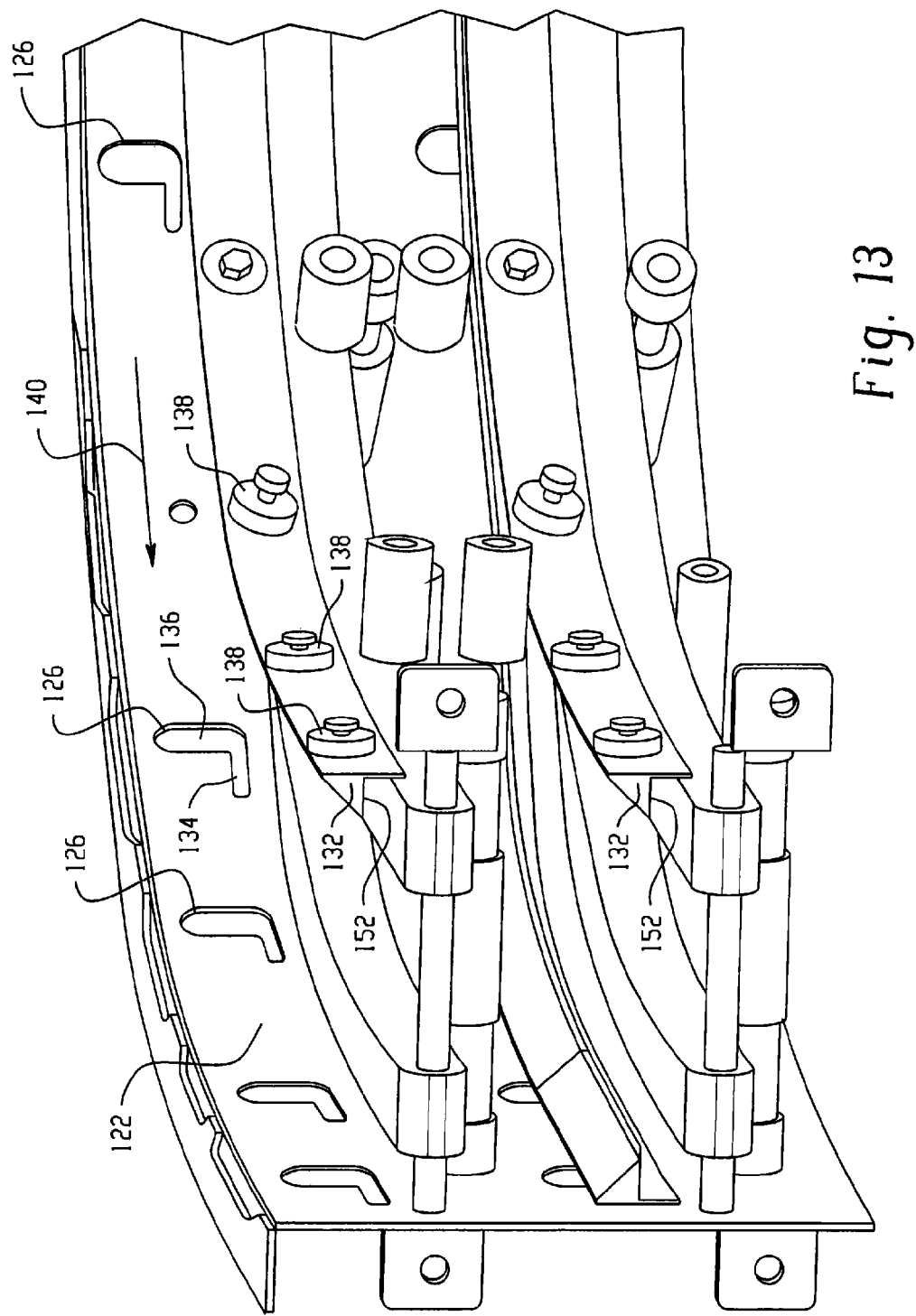
FIG. 13 shows a partial perspective of the embodiment of FIG. 11 with certain components removed.

Referring now to FIGS. 11-13, another embodiment of a conveyor assembly 120 is shown. In this embodiment, the outer curved side portion 122 and inner curved side portion 124 of the frame system each include a plurality of respective slots 126 and 128. The slots 126 and 128 are used to attach hold down guides 130 and 132 (e.g., with respective lips 150, 152 facing into the curved conveyor path) in place during operation of the machine, but also allow removal of the guides 130 and 132 for the purposed of access to the conveyor belt (e.g., to enable removal of the conveyor belt). In particular, each slot (e.g., 128) has a keyway configuration with a retention end 134 and a larger removal end or segment 136. The curved hold down guides include keyway buttons (e.g., 138) that pass through the keyway slots. The slots are configured such that when the curved hold down guide is in the operating position the keyway buttons are positioned toward the retention ends of the slots. The keyway buttons are moved along the slots to the removal segments of the slots to allow the keyway buttons to be removed from the slots (e.g., by pulling the guides further into the curved conveyor path) in order to move the curved hold down guides from the operating positions to the access positions. Thus, in the access positions the curved hold down guides of this embodiment are fully detached from the frame system.

The retention ends 134 of the slots may be located downstream of the removal segments 136 of the slots (relative to a conveyance direction 140) of the conveyor belt (not shown) so that interaction between the conveyor belt and the curved hold down guides during movement of the conveyor belt tends to urge the curved hold down guides into the operating positions.

In one example, the curved hold down guides 130, 132 may be formed of a flexible extruded plastic, and the keyway buttons may be formed of stainless steel and threaded into corresponding holes in the side of the body of the hold down guides. The illustrated keyway slots have an L-shape configuration. The wear strips and corresponding supports of the embodiment of FIGS. 11-13 may be similar to those described above for the previous embodiment.

The hold down guides 130, 132 can be removed by manually moving them backward along the curved path (e.g., in the direction opposite the conveyance direction 140) until the protruding retaining portion of the keyway buttons align with the larger removal segments 136 of the slots 126, 128, and then pulling the hold down guides inward away from the side portions 122, 124 so that the keyway buttons are removed entirely from the slots.

In the case of both of the above illustrated embodiments, each provides a method of maintenance and/or cleaning of a curved conveyor, where the method involves utilizing a curved frame system that defines a curved conveyance path along which a conveyor belt extends. The curved conveyance path has a plurality of hold down guides mounted to respective slots on the frame system with the hold down guides in respective operating positions. Each hold down guide, when in its operating position, includes a lip portion within the curved conveyance path and positioned proximate a top edge portion of the conveyor belt for limiting upward movement of the top edge portion of the conveyor belt. By moving each hold down guide relative to its respective slot, the hold down guide can be moved to an access position that permits upward movement of the top edge portion of the conveyor belt.

It is to be clearly understood that the above description is intended by way of illustration and example only, is not intended to be taken by way of limitation, and that other changes and modifications are possible. For example, while latch systems in the form of brackets and pull-pins are described above, it is recognized that other types of latches could be used in connection with the hold down guides, such as rotating latch members (e.g., a rotating latch member with a cam surface that interacts with the side of the guide to push the guide into the operating position when rotated in one direction and moves clear of the side of the guide when rotated in the opposite direction, spring-loaded latches or others). Ideally, any such latch system would be formed to be retained on the frame system even during the cleaning or maintenance operations. While two embodiments of a curved conveyor assembly is primarily shown, it is recognized that the curved conveyor assembly may be just a portion of a larger conveyor assembly that includes multiple straight sections and additional curved sections. The radius and type of curvature, as well as overall angle of turn can also vary from that shown.

What is claimed is:

1. A curved conveyor assembly, comprising:
a frame system with an inner curved side portion, an outer curved side portion spaced from the inner curved side portion to define a curved path, and at least one slot formed in one of the outer curved side portion or the inner curved side portion;
a conveyor belt positioned between the inner curved side portion and the outer curved side portion and movable along the curved path;
at least one curved hold down guide associated with the slot and located in an operating position in which a retaining lip of the curved hold down guide is positioned within the curved path proximate a top side of an edge of the conveyor belt for limiting upward movement of the edge of the conveyor belt as the conveyor belt moves along the curved path, the curved hold down guide movable relative to the slot and the frame system to an access position in which the retaining lip is spaced from the edge of the conveyor belt enabling the edge of the conveyor belt to move upward.

2. The curved conveyor assembly of claim 1 wherein at least part of the curved hold down guide is movable laterally through the slot for repositioning the curved hold down guide from the operating position to the access position.

3. The curved conveyor assembly of claim 2 wherein:
a body of the curved hold down guide is movable laterally through the slot in a direction away from the curved path for movement from the operating position and the access position, in the access position the curved hold down guide remains aligned with the slot.

4. The curved conveyor assembly of claim 3 wherein:
the slot is located in the outer curved side portion;
the outer curved side portion includes multiple slots each having a respective outer curved hold down guide therein;
the inner curved side portion includes multiple slots each having a respective inner curved hold down guide therein.

5. The curved conveyor assembly of claim 3, further comprising:
at least one latch movable between a first position for holding the curved hold down guide in the operating position and a second position for allowing the curved hold down guide to move through the slot from the operating position to the access position.

6. The curved conveyor assembly of claim 5 wherein the latch is formed by a manually movable pin member extending through a bracket and into engagement with the curved hold down guide, the bracket located adjacent the slot.

7. The curved conveyor assembly of claim 6 wherein the pin is tethered to the frame.

8. The curved conveyor assembly of claim 6 wherein the bracket further includes a stop surface for limiting movement of the curved hold down guide laterally away from the curved path and a support surface for supporting the curved hold down guide when in the access position.

9. The curved conveyor assembly of claim 2 wherein:
the slot has a keyway configuration;
the curved hold down guide includes a keyway button that passes through the keyway slot.

10. The curved conveyor assembly of claim 9 wherein:
the slot is configured such that when the curved hold down guide is in the operating position the keyway button is positioned toward a retention end of the slot, the keyway button is moved along the slot to a removal segment of the slot to allow the keyway button to be removed from the slot in order to move the curved hold down guide from the operating position to the access position; and
in the access position the curved hold down guide is detached from the frame system.

11. The curved conveyor assembly of claim 10 wherein:
the frame system includes multiple slots, each having a keyway configuration;
the curved hold down guide includes multiple keyway buttons each passing through a respective one of the slots when the curved hold down guide is in the operating position.

12. The curved conveyor assembly of claim 10 wherein the retention end of the slot is downstream of the removal segment of the slot relative to a conveyance direction of the conveyor belt so that interaction between the conveyor belt and the curved hold down guide during movement of the conveyor belt tends to urge the curved hold down guide into the operating position.

13. The curved conveyor assembly of claim 1 wherein the conveyor belt rides atop at least one wear strip when moving along the curved path.

14. The curved conveyor assembly of claim 13 wherein the wear strip includes one end pivotally mounted to the frame system and an opposite end sitting upon a cross support of the frame system such that, when the conveyor belt is removed, the wear strip can be pivoted upward to access a space below the wear strip for cleaning or maintenance.

15. The curved conveyor assembly of claim 14 wherein multiple spaced apart wear strips are located along a width of the curved path, and each of the multiple wear strips includes one end mounted on a common pivot.

16. A curved conveyor assembly, comprising:
a frame that defines a curved conveyance path;
a conveyor belt positioned on the frame system for travel along the curved conveyance path;
at least one hold down guide mounted to the frame and manually movable between an operating position and an access position, in the operating position a retaining lip of the hold down guide extends into the curved conveyance path proximate an edge of the conveyor belt for limiting upward movement of the edge of the conveyor belt, in the access position the retaining lip is moved away from the conveyor belt, wherein the hold down guide is mounted to a slot of the frame, and the slot has a keyway configuration and the hold down guide has a keyway button positioned within the slot.

17. A curved conveyor assembly, comprising:
a frame that defines a curved conveyance path;
a conveyor belt positioned on the frame system for travel along the curved conveyance path;
at least one hold down guide mounted to the frame and manually movable between an operating position and an access position, in the operating position a portion of the hold down guide is positioned proximate an edge of the conveyor belt for limiting upward movement of the edge of the conveyor belt, in the access position the portion is moved away from the conveyor belt, wherein the hold down guide is mounted to a slot of the frame, the slot has a keyway configuration and the hold down guide is mounted to the slot by a keyway button retainer positioned within the slot.

* * * * *